US012265153B2

(12) United States Patent
Vollbracht et al.

(10) Patent No.: US 12,265,153 B2
(45) Date of Patent: Apr. 1, 2025

(54) RADAR SYSTEM FOR A VEHICLE

(71) Applicant: Aptiv Technologies AG, Schaffhausen (CH)

(72) Inventors: Dennis Vollbracht, Hilden (DE); Mathias Busch, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 329 days.

(21) Appl. No.: 17/817,930

(22) Filed: Aug. 5, 2022

(65) Prior Publication Data

US 2023/0037906 A1 Feb. 9, 2023

(30) Foreign Application Priority Data

Aug. 6, 2021 (EP) .................................... 21190090

(51) Int. Cl.
*G01S 13/931* (2020.01)
*B60W 40/04* (2006.01)

(52) U.S. Cl.
CPC ........... *G01S 13/931* (2013.01); *B60W 40/04* (2013.01); *B60W 2420/408* (2024.01); *G01S 2013/9327* (2020.01)

(58) Field of Classification Search
None
See application file for complete search history.

(56) References Cited

U.S. PATENT DOCUMENTS

| 3,794,997 | A | 2/1974 | Iwatsuki et al. |
| 4,210,357 | A | 7/1980 | Adachi |
| 4,933,681 | A | 6/1990 | Estang |
| 2004/0222920 | A1* | 11/2004 | Suzuki .................... G01S 7/032 342/175 |
| 2006/0092076 | A1 | 5/2006 | Franson |
| 2021/0011144 | A1 | 1/2021 | Crosby |
| 2021/0239791 | A1 | 8/2021 | Vollbracht et al. |
| 2023/0039021 | A1 | 2/2023 | Bollbracht et al. |

(Continued)

FOREIGN PATENT DOCUMENTS

| DE | 4412769 | 10/1995 |
| DE | 10109371 | 11/2001 |
| DE | 10060603 | 6/2002 |

(Continued)

OTHER PUBLICATIONS

"Restriction Requirement", U.S. Appl. No. 17/817,909, Jul. 10, 2023, 9 pages.

(Continued)

*Primary Examiner* — Whitney Moore
(74) *Attorney, Agent, or Firm* — Harness, Dickey & Pierce, P.L.C.

(57) ABSTRACT

Disclosed are aspects of a radar system for a vehicle that includes a radar circuit for generating and processing radar signals, wherein the radar circuit includes a ground plane connector for an electrical connection with an antenna ground plane. The radar system also includes a radar antenna assembly for transmitting radar signals into a traffic space and for receiving radar signals reflected by objects present in the traffic space. The radar system further includes a component of the vehicle. The ground plane connector is electrically connected to the component of the vehicle.

18 Claims, 3 Drawing Sheets

(56) References Cited

U.S. PATENT DOCUMENTS

2023/0045388 A1  2/2023  Vollbracht et al.

FOREIGN PATENT DOCUMENTS

| | | |
|---|---|---|
| DE | 102016125190 | 6/2018 |
| DE | 102017223471 | 6/2019 |
| DE | 102019200127 | 7/2020 |
| EP | 0805360 | 11/1997 |
| EP | 0978729 | 2/2000 |
| JP | S5534541 | 3/1980 |
| JP | H11160426 | 6/1999 |
| JP | 2019009713 | 1/2019 |
| WO | 2013095223 | 6/2013 |

OTHER PUBLICATIONS

"Extended European Search Report", EP Application No. 21190101.2, Jan. 18, 2022, 12 pages.
"Extended European Search Report", EP Application No. 21190090.7, Jan. 26, 2022, 10 pages.
"Partial European Search Report", EP Application No. 21190108.7, Feb. 3, 2022, 17 pages.
"Extended European Search Report", EP Application No. 21190108.7, May 3, 2022, 20 pages.

* cited by examiner

RADAR SYSTEM FOR A VEHICLE

INCORPORATION BY REFERENCE

This application claims priority to European Patent Application Number 21190090.7, filed Aug. 6, 2021, the disclosure of which is incorporated by reference in its entirety.

BACKGROUND

Radar systems installed on vehicles are increasingly used to monitor the traffic space and in particular to detect objects like other vehicles, pedestrians, or stationary obstacles present in the traffic space. Many advanced driver assistance systems (ADAS), such as lane departure warning systems, lane change assistance systems, and active brake assist systems, rely on input signals provided by radar systems. Vehicle radar systems are also important for autonomous driving (AD) applications. Objects in the environment of a vehicle may be identified by means of transmitting a primary radar signal into the traffic space, receiving a secondary radar signal reflected by at least one object, and processing the secondary radar signal.

Usually, automotive radar systems are provided as modules comprising an integrated radar circuit and a radar antenna assembly arranged on a common board. The effective antenna size and therefore the angular resolution of such modules is limited. Further, due to the plurality of constructional elements which are necessary for such a module, the fabrication costs are comparatively high.

Accordingly, there is a need to provide a vehicle radar system which is easy to produce and which has an improved resolution.

SUMMARY

The present disclosure provides a radar system and methods for fabricating a radar system according to the independent claims. Example embodiments are given in the subclaims, the description, and the drawings. The present disclosure further relates to vehicle radar systems and to methods for fabricating such systems.

In one aspect, the present disclosure is directed at a radar system for a vehicle, with the radar system comprising a radar circuit configured to generate and process radar signals, wherein the radar circuit comprises a ground plane connector for an electrical connection with an antenna ground plane. The radar system also comprises a radar antenna assembly configured to transmit radar signals into a traffic space and to receive radar signals reflected by objects present in the traffic space. The radar system further comprises a component of the vehicle, and the ground plane connector is electrically connected to the component of the vehicle.

The component of the vehicle may be a metallic component.

Thus, the component of the vehicle may be used as the antenna ground plane. The material costs may be reduced by omitting any separate ground plane. By incorporating an already present structure of the vehicle into the antenna design, it is also possible to omit further elements like a radome. The component of the vehicle may have a relatively large size and thus provide a large space for an arrangement of antenna elements. Therefore, the aperture of the radar antenna assembly may be considerably extended compared to radar building blocks. Since the antenna ground plane is separated from the control board, the size of the control board may be reduced without deteriorating the antenna performance.

In radar technology, an antenna ground plane is an electrically conducting surface connected to ground. To ensure an adequate impedance, the antenna elements, for example sticks, must not be located outside the area defined by the ground plane. In radar systems which are based on printed circuit boards, the antenna ground plane may be formed by a continuous copper foil provided on the board.

The radar system may further comprise one or more of the following features:

The component of the vehicle may have a front surface and a rear surface that opposes the front surface, wherein the radar circuit is arranged at the rear surface of the component, and at least one antenna element of the radar antenna assembly is arranged at the front surface of the component. In a mounted state of the component of the vehicle, the front surface may face away from a center of the vehicle. The component may comprise at least one duct extending from the front surface to the rear surface, wherein the at least one antenna element of the radar antennas assembly is connected to the radar circuit via a waveguide member guided through the at least one duct of the component. The ground plane connector may be electrically connected to the component in or at the at least one duct.

In some cases, the component comprises a plate-like or sheet-like portion. The component of the vehicle may be a crash beam, a bumper, a pillar, or a door of the vehicle. The component of the vehicle may have a recess and an insert member insertable into the recess, wherein the ground plane connector is electrically connected to the insert member. The radar circuit may be formed on a printed circuit board. The printed circuit board may be configured without any ground plane layer—e.g., may omit or lack a ground plane layer. At least one antenna element of the radar antenna assembly may be spaced apart from the printed circuit board. The component may have a surface area of at least 400 square centimeters ($cm^2$), in particular of at least 1000 $cm^2$. The radar circuit may be arranged in a housing which is attached to the component.

According to an embodiment, the component of the vehicle has a front surface and a rear surface that opposes the front surface (e.g., an opposing rear surface), wherein the radar circuit is arranged at the rear surface of the component, and at least one antenna element of the radar antenna assembly is arranged at the front surface of the component. Specifically, the component may comprise a plate-like or sheet-like portion having the front surface and the rear surface.

According to another embodiment, the front surface faces away from a center of the vehicle in a mounted state of the component of the vehicle. Therefore, the at least one antenna element is not shielded by the component.

According to another embodiment, the component comprises at least one duct extending from the front surface to the rear surface, wherein the at least one antenna element is connected to the radar circuit via a waveguide member guided through the at least one duct of the component. The at least one duct enables a connection of the radar circuit to the at least one antenna element despite the component being arranged therebetween.

According to another embodiment, the ground plane connector is electrically connected to the component in or at the duct.

According to another embodiment, the component comprises a plate-like or sheet-like portion. Such a portion is particularly suitable as an antenna ground plane. The plate-like or sheet-like portion may be flat or curved.

According to another embodiment, the component of the vehicle is a crash beam, a bumper, a pillar, a door, or a portion thereof. Usually, such structures are already present in a motor vehicle and may be used as a component of a radar antenna assembly.

According to another embodiment, the component of the vehicle has a recess and an insert member insertable into the recess, wherein the ground plane connector is electrically connected to the insert member. A manufacturer of the radar system may easily prefabricate a module comprising the insert member and deliver the module to a manufacturer of the vehicle, who inserts the insert member into the recess of an existing crash beam or the like.

According to another embodiment, the radar circuit is formed on a printed circuit board. This enables a space saving construction. The radar circuit may comprise a monolithic microwave integrated circuit (MMIC). The monolithic microwave integrated circuit may comprise a waveguide outlet. Such a monolithic microwave integrated circuit may be directly coupled to the vehicle structure.

According to another embodiment, the printed circuit board is configured without any ground plane layer. Thereby, the production costs are significantly reduced.

According to another embodiment, at least one antenna element of the radar antenna assembly is spaced apart from the printed circuit board. In this manner, due to the separation from the antenna ground plane, the printed circuit board may be downsized without reducing the antenna size.

According to another embodiment, the component has a surface area of at least 400 square centimeters ($cm^2$), in particular of at least 1000 $cm^2$. A relatively large size of the component provides sufficient space for arranging an array of antenna elements.

According to another embodiment, the radar circuit is arranged in a housing which is attached to the component. The housing protects the radar circuit from dust, splash water, and the like.

In another aspect, the present disclosure is directed at a vehicle comprising a chassis, a body, and a radar system as disclosed herein, wherein the component is a portion of the chassis or the body.

In another aspect, the present disclosure is directed at a radar system for a vehicle, with the radar system comprising radar transmitters, radar transceivers, and antenna elements configured to transmit radar signals into a traffic space and to receive radar signals reflected by objects present in the traffic space. The antenna elements are connected to the radar transmitters and the radar transceivers via transitions and a non-metallic component of the vehicle, wherein the transitions are formed by the non-metallic component of the vehicle. Further, transitions of a radar circuit board may be positioned in ducts or recesses of a non-metallic component of the vehicle such as a glass fiber layer. In this configuration, the transitions may not be a part of the vehicle, but a part of the sensor. It is not necessary for a manufacturer of the component of the vehicle to manufacture the ducts or recesses in the component with excessively high precision. Since the transitions are provided by the manufacturer of the radar system, the component of the vehicle may be fabricated with higher admissible tolerances.

In another aspect, the present disclosure is directed at a method for fabricating a radar system for a vehicle, in particular a radar system as described above. The method comprises the following steps: attaching a radar circuit to a component of a vehicle, wherein the radar circuit is configured to generate and process radar signals, and wherein the radar circuit comprises a ground plane connector for an electrical connection with an antenna ground plane; attaching a radar antenna assembly configured to transmit radar signals into a traffic space and to receive radar signals reflected by objects present in the traffic space to the component of the vehicle; and electrically connecting the ground plane connector to the component of the vehicle.

In another aspect, the present disclosure is directed at a method for fabricating a radar system for a vehicle, in particular a radar system as described above. The method comprises the following steps: attaching a radar circuit to a metallic plate member, wherein the radar circuit is configured to generate and process radar signals, and wherein the radar circuit comprises a ground plane connector for an electrical connection with an antenna ground plane; attaching a radar antenna assembly configured to transmit radar signals into a traffic space and to receive radar signals reflected by objects present in the traffic space to the metallic plate member; electrically connecting the ground plane connector to the metallic plate member; and attaching the metallic plate member to a component of the vehicle.

BRIEF DESCRIPTION OF THE DRAWINGS

Example embodiments and functions of the present disclosure are described herein in conjunction with the following drawings, showing schematically.

DETAILED DESCRIPTION

Figure 1:
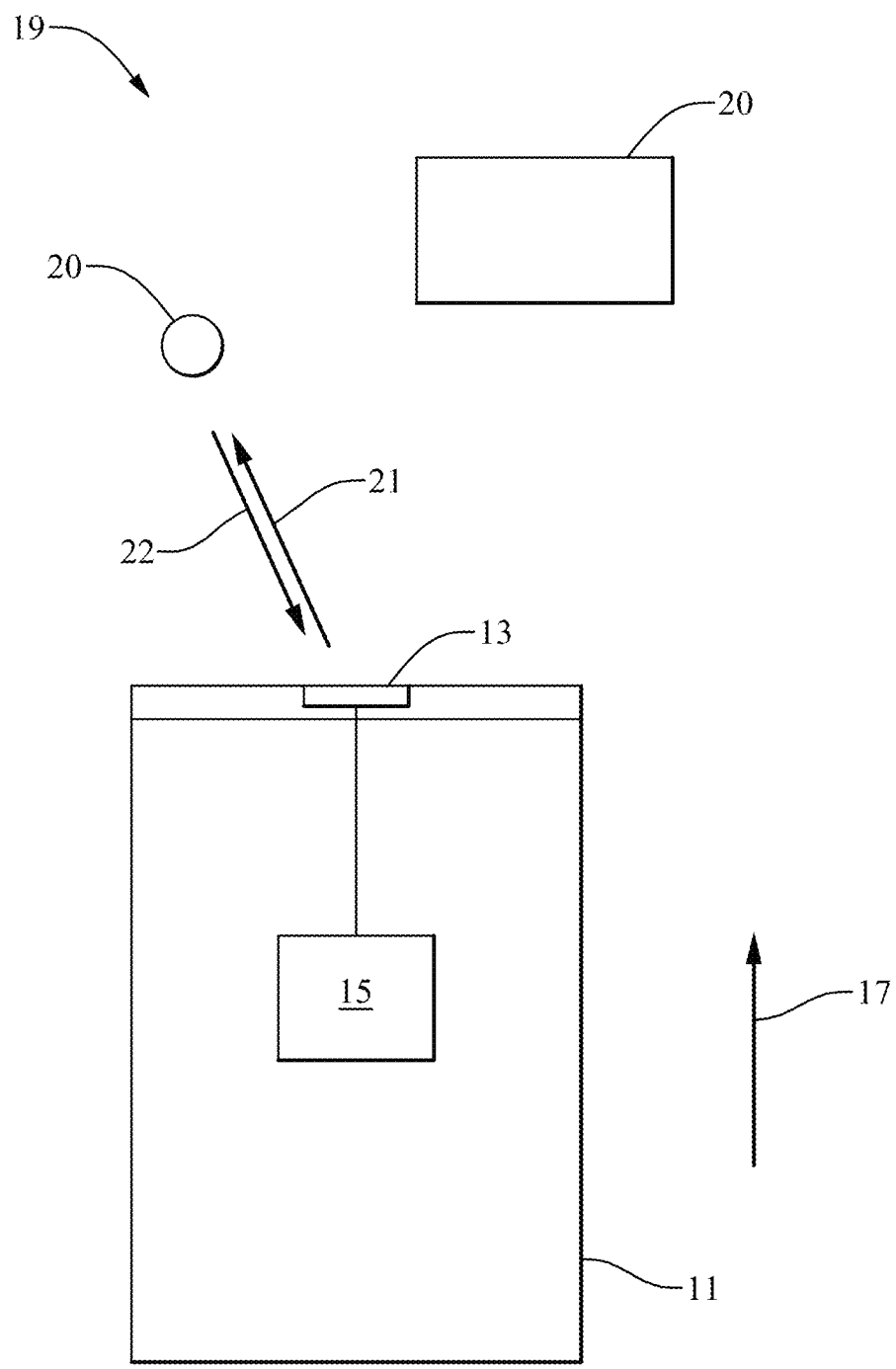
FIG. 1 is a motor vehicle equipped with a radar system.

FIG. 1 schematically depicts a motor vehicle 11, also called a host vehicle, and a radar system 13 mounted to a front portion of the motor vehicle 11. The radar system 13 is connected to an electronic processing device 15, for example an advanced driver assistance system or an autonomous driving system. In operation, the motor vehicle 11 is moving in a driving direction 17 in a traffic space 19, for example a road. Objects 20, such as other vehicles, pedestrians, or stationary obstacles, may be located in the traffic space 19.

The radar system 13 is configured for transmitting at least one primary radar signal 21 into the traffic space 19 and for detecting objects 20 present in the traffic space 19 on the basis of at least one secondary radar signal 22 reflected by the objects 20, as is generally known in the art.

Figure 2:
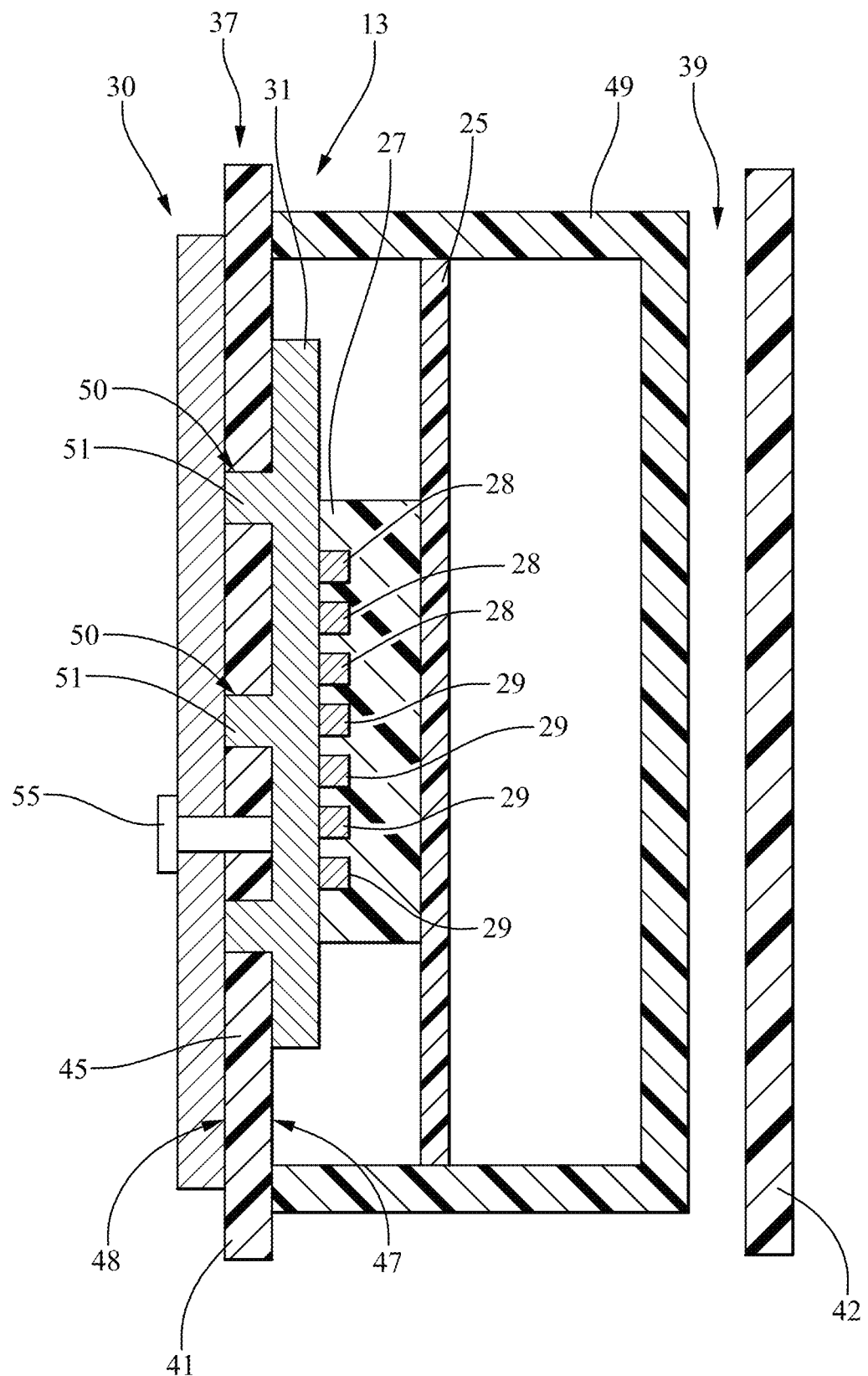
FIG. 2 is a cross-sectional side view of a radar system according to various embodiments.
Figure 3:
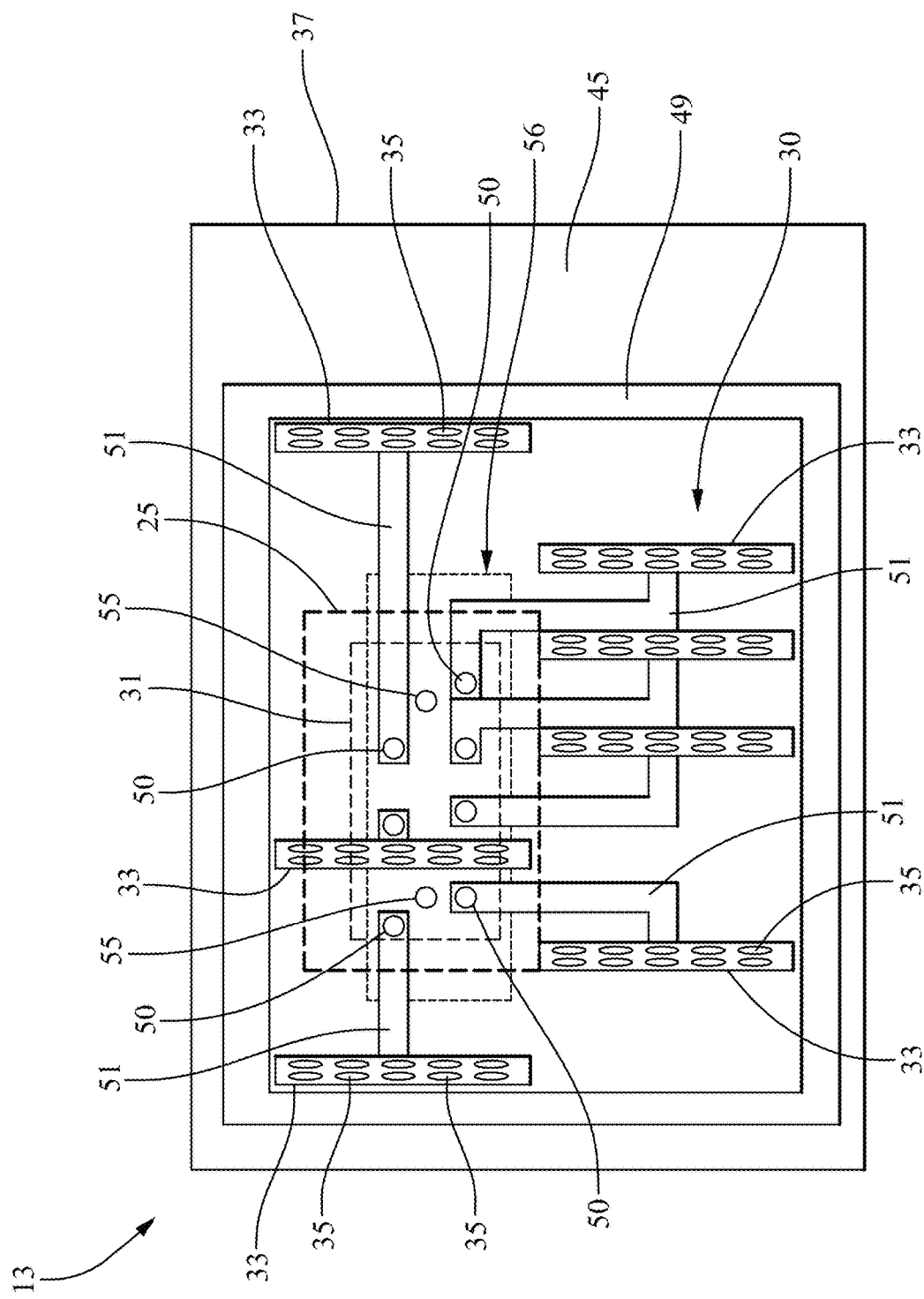
FIG. 3 is a front view of a radar system according to various embodiments.

According to various embodiments, as depicted in FIGS. 2 and 3, the radar system 13 comprises a control board 25 carrying a radar circuit 27 for generating and processing radar signals. The radar circuit 27 may be configured as a monolithic microwave integrated circuit (MMIC). As shown by way of example, the radar circuit 27 comprises three radar transmitters 28 and four radar receivers 29. The number of radar transmitters 28 and radar receivers 29 may vary dependent on the application.

Further, the radar system 13 comprises a radar antenna assembly 30 for transmitting primary radar signals 21 into the traffic space 19 (FIG. 1) and for receiving secondary radar signals 22 reflected by objects 20 present in the traffic space 19. The radar transmitters 28 and the radar receivers 29 are connected to respective antenna elements 33 (FIG. 3) of the radar antenna assembly 30 via a distribution network 31. The distribution network 31 may be based on a metallized plastic layer. According to an alternative embodiment, not shown, the distribution network 31 is omitted and a direct connection of the radar transmitters 28 and the radar receivers 29 to the respective antenna elements 33 is provided. The antenna elements 33 may comprise dielectric radiators 35, for example slot radiators adapted for a frequency of 77 GHz.

The radar system 13 is integrated in a crash beam 37 of the vehicle 11. Specifically, the crash beam 37 defines a cavity 39 in which the control board 25 is arranged. The cavity 39 is defined between a front section 41 and a rear section 42 of the crash beam 37. The crash beam 37, which may be made from steel or another metal, is fixedly connected to a frame or a body of the vehicle 11 (FIG. 1). For example, the crash beam 37 may be configured as a hollow profile. Both the front section 41 and the rear section 42 are shaped plate-like or sheet-like. Dependent on the application, they may be curved instead of planar as shown.

The radar circuit 27 comprises a ground plane connector, not shown, which is electrically connected to the front section 41 of the crash beam 37. Thus, the front section 41 of the crash beam 37 forms an antenna ground plane 45 of the radar antenna assembly 30. A separate antenna ground plane incorporated in the control board 25, such as a copper foil, is not necessary.

As shown, the radar circuit 27 is arranged at the rear surface 47 of the front section 41, whereas the antenna elements 33 are arranged at the front surface 48 of the front section 41. In a mounted state of the crash beam 37, the front surface 48 faces away from a central portion of the vehicle 11. A housing 49 enclosing the control board 25 is attached to the rear surface 47 of the front section 41.

To enable individual connections of the radar circuit 27 to the antenna elements 33, transitions or ducts 50 are provided in the front section 41 of the crash beam 37. The ducts 50 respectively extend from the front surface 48 to the rear surface 47 of the front section 41. Waveguide members 51 (FIG. 3) connecting the radar transmitters 28 and the radar transceivers 29 (FIG. 2) to the antenna elements 33 are guided through the ducts 50. The ground plane connector may be electrically connected to the front section 41 of the crash beam 27 in the region of the ducts 50.

The ducts 50 may be holes or passages that have been drilled or cut into a regular crash beam 37. Alternatively, the crash beam 37 may have a recess, not shown, into which a separately fabricated insert member comprising the ducts 50 is inserted.

As can be seen in FIG. 3, some of the antenna elements 33 are laterally spaced apart from the control board 25. Due to the formation of the ground plane 45 by the front section 41 of the crash beam 37, the effective antenna size of the radar antenna assembly 30 is not limited to the size of the control board 25. Therefore, the resolution of the radar antenna assembly 30 is high. In particular, a large horizontal distance between antenna elements 33 enables a high azimuthal resolution, whereas a large vertical distance between antenna elements 33 enables a high elevational resolution. Dependent on the application and on the shape of the crash beam 37, the azimuthal resolution or the elevational resolution may be maximized. Since the antenna design is not determined by the size and the shape of the control board 25, there is an increased flexibility with respect to the operational parameters of the radar system 13.

Since at least some of the parts of the radar system 13 are received in the cavity 39 which is present anyway, only little installation space is required.

At least a portion of the radar antenna assembly 30 and/or of the waveguide members 51 may be integrated in a flat carrier 56 attached to the front surface 48. The flat carrier 56 may be made from a plastic material. The carrier 56 may be pressed against the front surface 48 by means of screws 55 or other fastening elements to enhance the stability of the assembly and to improve the electrical connection between the ground plane 45 and the antenna assembly 30.

A method for fabricating the disclosed radar system 13 comprises the step of forming the ducts 50 in the crash beam 37 and of attaching the control board 25 as well as the housing 49 to the rear surface 47 of the front section 41 of the crash beam 37. The method further comprises the steps of guiding the waveguide members 51 through the ducts 50 and of attaching the antenna elements 33 to the front surface 48 of the front section 41 of the crash beam 37, for example by means of alignment pins, not shown, and/or a conductive adhesive. The waveguide members 51 may comprise interfaces, not shown, to enable a connection of the front surface part and the rear surface part of the radar system 13, for example by plugging and/or gluing the parts together. The interfaces may be located at or in the ducts 50. The method can further comprise electrically connecting the ground plane connector to the front section 41 of the crash beam 37. This may be achieved indirectly by attaching the antenna elements 33 to the front surface 48 in an electrically conducting manner.

A method for fabricating the disclosed radar system 13 may alternatively comprise the steps of providing a metallic plate member, not shown, of forming the ducts 50 in the metallic plate member, and of attaching the control board 25 as well as the housing 49 to a rear surface of the metallic plate member. The method may further comprise the step of guiding the waveguide members 51 through the ducts 50 and of attaching the antenna elements 33 to a front surface of the metallic plate member. The method may further comprise the steps of electrically connecting the ground plane connector to the metallic plate member and of inserting the metallic plate member into a recess of a crash beam.

Instead of the crash beam 37, another existing body or frame structure of the vehicle 11 may be used as an antenna ground plane 45. Thus, the ground plane connector may be electrically connected to another metallic component of the vehicle 11, for example to an A-pillar, a bumper, or a door. It is possible to arrange the radar system 13 at a bended portion of a metallic component, for example to form a corner radar system.

The use of an existing metallic structure of a vehicle 11 as an antenna ground plane is possible in connection with a wide variety of antenna types, for example bistatic, grouped, and multiple input multiple output (MIMO) antennas.

Example Implementations

Example 1: A radar system for a vehicle, the radar system comprising: a radar circuit for generating and processing radar signals, wherein the radar circuit comprises a ground plane connector for an electrical connection with an antenna ground plane; a radar antenna assembly for transmitting radar signals into a traffic space and for receiving radar signals reflected by objects present in the traffic space; and a component of the vehicle, wherein the ground plane connector is electrically connected to the component of the vehicle.

Example 2: The radar system of example 1, wherein the component of the vehicle has a front surface and an opposing rear surface, wherein the radar circuit is arranged at the rear surface of the metallic component, and at least one antenna element of the radar antenna assembly is arranged at the front surface of the component.

Example 3: The radar system of example 2, wherein, in a mounted state of the component of the vehicle, the front surface faces away from a center of the vehicle.

Example 4: The radar system of example 2 or example 3, wherein the component comprises at least one duct extending from the front surface to the rear surface, and wherein the at least one antenna element is connected to the radar circuit via a wave-guide member guided through the at least one duct of the component.

Example 5: The radar system of example 4, wherein the ground plane connector is electrically connected to the component in or at the duct.

Example 6: The radar system of at least any one of examples 1 to 5, wherein the component comprises a plate-like or sheet-like portion.

Example 7: The radar system of at least any one of examples 1 to 6, wherein the component forms at least a part of a crash beam, a bumper, a pillar, or a door of the vehicle.

Example 8: The radar system of at least any one of examples 1 to 7, wherein the component has a recess and an insert member insertable into the recess, and wherein the ground plane connector is electrically connected to the insert member.

Example 9: The radar system of at least any one of examples 1 to 8, wherein the radar circuit is formed on a printed circuit board.

Example 10: The radar system of example 9, wherein the printed circuit board is configured without any ground plane layer.

Example 11: The radar system of example 9 or example 10, wherein at least one antenna element of the radar antenna assembly is spaced apart from the printed circuit board.

Example 12: The radar system of at least any one of examples 1 to 11, wherein the component has a surface area of at least 400 cm$^2$, in particular of at least 1000 cm$^2$.

Example 13: A vehicle comprising a chassis, a body, and the radar system of at least any one of examples 1 to 12, wherein the component is a portion of the chassis or the body.

Example 14: A method for fabricating a radar system for a vehicle, in particular the radar system of at least any one of examples 1 to 12, wherein the method comprises the following steps: attaching a radar circuit to a component of a vehicle, wherein the radar circuit is configured to generate and process radar signals, and wherein the radar circuit comprises a ground plane connector for an electrical connection with an antenna ground plane; attaching a radar antenna assembly for transmitting radar signals into a traffic space and for receiving radar signals reflected by objects present in the traffic space to the component of the vehicle; and electrically connecting the ground plane connector to the component of the vehicle.

Example 15: A method for fabricating a radar system for a vehicle, in particular the radar system of at least any one of examples 1 to 12, wherein the method comprises the following steps: attaching a radar circuit to a metallic plate member, wherein the radar circuit is configured to generate and process radar signals, and wherein the radar circuit comprises a ground plane connector for an electrical connection with an antenna ground plane; attaching a radar antenna assembly for transmitting radar signals into a traffic space and for receiving radar signals reflected by objects present in the traffic space to the metallic plate member; electrically connecting the ground plane connector to the metallic plate member; and attaching the metallic plate member to a component of the vehicle.

LIST OF REFERENCE CHARACTERS FOR THE ITEMS IN THE DRAWINGS

The following is a list of certain items in the drawings, in numerical order. Items not included in the list may nonetheless be part of a given embodiment. For better legibility of the text, a given reference character may be recited near some, but not all, recitations of the referenced item in the text. The same reference number may be used with reference to different examples or different instances of a given item.

11 motor vehicle
13 radar system
15 electronic processing device
17 driving direction
19 traffic space
20 object
21 primary radar signal
22 secondary radar signal
25 control board
27 radar circuit
28 radar transmitter
29 radar receiver
30 radar antenna assembly
31 distribution network
33 antenna element
35 dielectric radiator
37 crash beam
39 cavity
41 front section
42 rear section
45 ground plane
47 rear surface
48 front surface
49 housing
50 duct
51 waveguide member
55 screw
56 carrier

What is claimed is:

1. A radar system, the radar system comprising:
a radar circuit configured to generate and process radar signals, the radar circuit comprising a ground plane connector for an electrical connection with an antenna ground plane;
a radar antenna assembly including at least one antenna element configured to transmit radar signals into a traffic space and to receive radar signals reflected by objects present in the traffic space; and
a component of a vehicle,
the ground plane connector electrically connected to the component of the vehicle, wherein:
the component of the vehicle includes a front surface, a rear surface that opposes the front surface, and includes at least one duct that extends between the front surface and the rear surface,
the radar circuit is arranged at the rear surface of the component, and
the at least one antenna element of the radar antenna assembly is arranged at the front surface of the component and connected to the radar circuit via a waveguide member guided through the at least one duct.

2. The radar system of claim 1, wherein:
in a mounted state of the component of the vehicle, the front surface faces away from a center of the vehicle.

3. The radar system of claim 1, wherein:
the ground plane connector is electrically connected to the component in or at the at least one duct.

4. The radar system of claim 1, wherein:
the component of the vehicle comprises a plate-like or sheet-like portion.

5. The radar system of claim 1, wherein:
the component of the vehicle forms at least a part of a crash beam, a bumper, a pillar, or a door of the vehicle.

6. The radar system of claim 1, wherein:
the component of the vehicle comprises a recess and an insert member insertable into the recess; and
the ground plane connector is electrically connected to the insert member.

7. The radar system of claim 6, wherein:
the insert member is configured to operate as the antenna ground plane.

8. The radar system of claim 1, wherein:
the radar circuit is formed on a printed circuit board.

9. The radar system of claim 8, wherein:
the printed circuit board is configured without any ground plane layer.

10. The radar system of claim 8, wherein:
at least one antenna element of the radar antenna assembly is spaced apart from the printed circuit board.

11. The radar system of claim 1, wherein:
the component of the vehicle has a surface area of at least 400 square centimeters ($cm^2$).

12. The radar system of claim 11, wherein:
the component of the vehicle has a surface area of at least 1000 square centimeters ($cm^2$).

13. The radar system of claim 1, wherein:
the component of the vehicle is configured to operate as the antenna ground plane.

14. A method for fabricating a radar system according to claim 1 for a vehicle, the method comprising:
attaching the radar circuit to the component of the vehicle;
attaching the radar antenna assembly to the component of the vehicle; and
electrically connecting the ground plane connector to the component of the vehicle.

15. The method of claim 14, further comprising:
attaching the radar circuit to a metallic plate member;
attaching the radar antenna assembly to the metallic plate member;
electrically connecting the ground plane connector to the metallic plate member; and
attaching the metallic plate member to the component of the vehicle.

16. A vehicle comprising:
a chassis;
a body; and
a radar system comprising:
a radar circuit configured to generate and process radar signals, the radar circuit comprising a ground plane connector for an electrical connection with an antenna ground plane;
a radar antenna assembly including at least one antenna element configured to transmit radar signals into a traffic space and to receive radar signals reflected by objects present in the traffic space; and
a component of the vehicle, the component of the vehicle forming a portion of at least one of the chassis or the body,
the ground plane connector electrically connected to the component of the vehicle, wherein:
the component of the vehicle includes a front surface, a rear surface that opposes the front surface, and includes at least one duct that extends between the front surface and the rear surface,
the radar circuit is arranged at the rear surface of the component, and
the at least one antenna element of the radar antenna assembly is arranged at the front surface of the component and connected to the radar circuit via a waveguide member guided through the at least one duct.

17. The vehicle of claim 16, wherein:
the radar circuit is formed on a printed circuit board;
the printed circuit board omits a ground plane layer; and
at least one antenna element of the radar antenna assembly is spaced outside of an area defined by the printed circuit board.

18. The radar system of claim 17, wherein:
the component of the vehicle is configured to operate as the antenna ground plane.

* * * * *